(12) United States Patent
Pham

(10) Patent No.: US 9,896,147 B2
(45) Date of Patent: Feb. 20, 2018

(54) THREE WHEELED VELOCIPEDE

(71) Applicant: Quan Pham, Arlington, TX (US)

(72) Inventor: Quan Pham, Arlington, TX (US)

( * ) Notice: Subject to any disclaimer, the term of this patent is extended or adjusted under 35 U.S.C. 154(b) by 129 days.

(21) Appl. No.: 15/014,229

(22) Filed: Feb. 3, 2016

(65) Prior Publication Data

US 2017/0217528 A1    Aug. 3, 2017

(51) Int. Cl.
| | |
|---|---|
| *B62K 7/02* | (2006.01) |
| *B62K 5/08* | (2006.01) |
| *B62J 6/02* | (2006.01) |
| *B62L 1/02* | (2006.01) |
| *B62K 5/05* | (2013.01) |
| *B62L 3/02* | (2006.01) |
| *B62K 13/04* | (2006.01) |
| *B62L 1/06* | (2006.01) |

(52) U.S. Cl.
CPC ............... *B62K 7/02* (2013.01); *B62J 6/02* (2013.01); *B62K 5/05* (2013.01); *B62K 5/08* (2013.01); *B62K 13/04* (2013.01); *B62L 1/02* (2013.01); *B62L 3/02* (2013.01); *B62L 1/06* (2013.01)

(58) Field of Classification Search
CPC ............... B62K 7/02; B62K 5/05; B62K 5/08
See application file for complete search history.

(56) References Cited

U.S. PATENT DOCUMENTS

| | | | |
|---|---|---|---|
| 625,377 A | 5/1898 | Blood | |
| 622,500 A * | 4/1899 | Kuster | B62J 1/14 280/202 |
| 855,979 A * | 6/1907 | Razoux | B62J 1/14 280/202 |
| 1,059,466 A * | 4/1913 | Hosmer | B62J 1/14 280/202 |
| 1,427,417 A * | 8/1922 | Rickey | B62K 5/02 280/202 |
| 1,661,257 A * | 3/1928 | Kirch | B62K 5/05 280/202 |
| D149,194 S | 4/1948 | Larralde | |
| 4,637,808 A * | 1/1987 | Nakamura | B62M 9/16 474/80 |
| 4,767,130 A * | 8/1988 | Fu-Chao | A61G 5/003 280/202 |
| 4,770,431 A | 9/1988 | Kulik | |
| 4,789,175 A * | 12/1988 | Schramm | A61G 5/003 280/282 |
| 4,830,388 A | 5/1989 | Wang | |

(Continued)

FOREIGN PATENT DOCUMENTS

WO    WO2014137028    9/2014

*Primary Examiner* — Kevin Hurley
*Assistant Examiner* — Michael R Stabley

(57) ABSTRACT

A three wheeled velocipede for three wheeled transport of a driver and a passenger includes a rear frame. A rear wheel is rotationally coupled to the rear frame. A drive train is coupled to the rear frame and operationally coupled to the rear wheel. The drive train is configured to transfer pedal motion imparted by a driver to the rear wheel. A first seat, positioned to seat the driver, is coupled to the rear frame. A front frame is pivotally coupled to a front end of the rear frame. A second seat is couplable to the front frame. The second seat is positionable to seat a passenger. Each of a pair of front wheels is rotationally coupled to a respective opposing side of the front frame.

19 Claims, 7 Drawing Sheets

(56) References Cited

U.S. PATENT DOCUMENTS

| | | | |
|---|---|---|---|
| 6,341,791 B1 | 1/2002 | Cannon, Sr. | |
| 7,780,184 B2 * | 8/2010 | Ehrenreich | B62B 7/12 |
| | | | 280/202 |
| 9,033,355 B2 * | 5/2015 | Lin | B62K 27/00 |
| | | | 280/202 |
| 9,150,271 B1 * | 10/2015 | Liu | B62K 27/10 |
| 9,469,323 B2 * | 10/2016 | Lin | B62B 5/0079 |

* cited by examiner

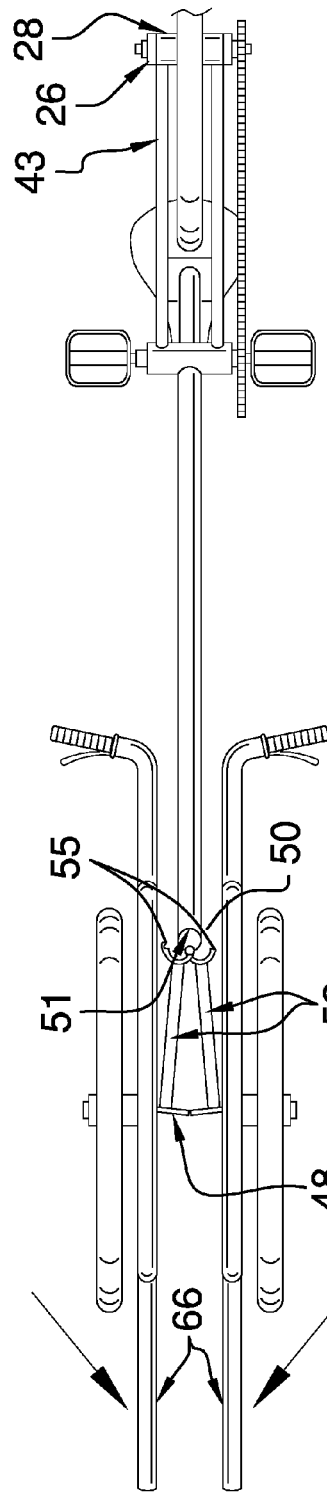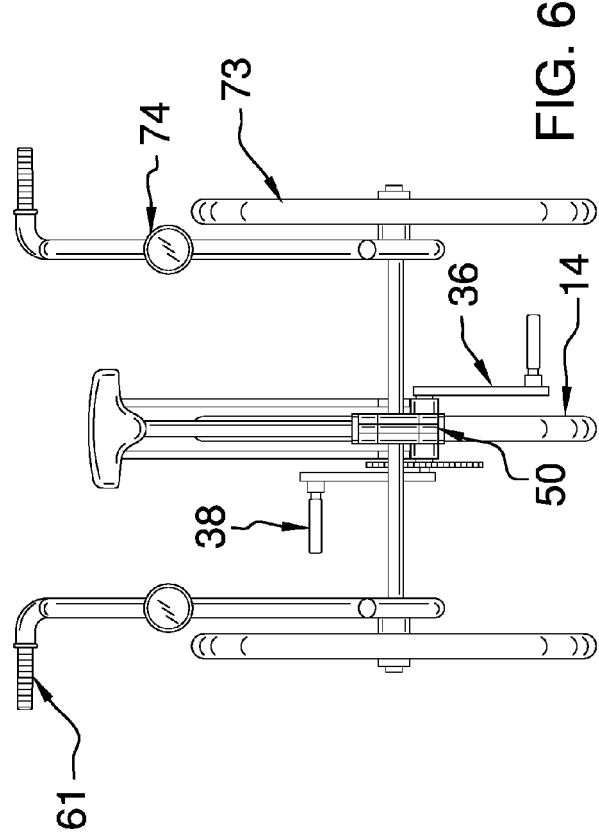

THREE WHEELED VELOCIPEDE

BACKGROUND OF THE DISCLOSURE

Field of the Disclosure

The disclosure relates to velocipedes and more particularly pertains to a new velocipede for three wheeled transport of a driver and a passenger.

SUMMARY OF THE DISCLOSURE

An embodiment of the disclosure meets the needs presented above by generally comprising a rear frame. A rear wheel is rotationally coupled to the rear frame. A drive train is coupled to the rear frame and operationally coupled to the rear wheel. The drive train is configured to transfer pedal motion imparted by a driver to the rear wheel. A first seat, positioned to seat the driver, is coupled to the rear frame. A front frame is pivotally coupled to a front end of the rear frame. A second seat is couplable to the front frame. The second seat is positionable to seat a passenger. Each of a pair of front wheels is rotationally coupled to a respective opposing side of the front frame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 5 is a bottom view of an embodiment of the disclosure.
FIG. 6 is a front view of an embodiment of the disclosure.

DESCRIPTION OF THE PREFERRED EMBODIMENT

Figure 1:
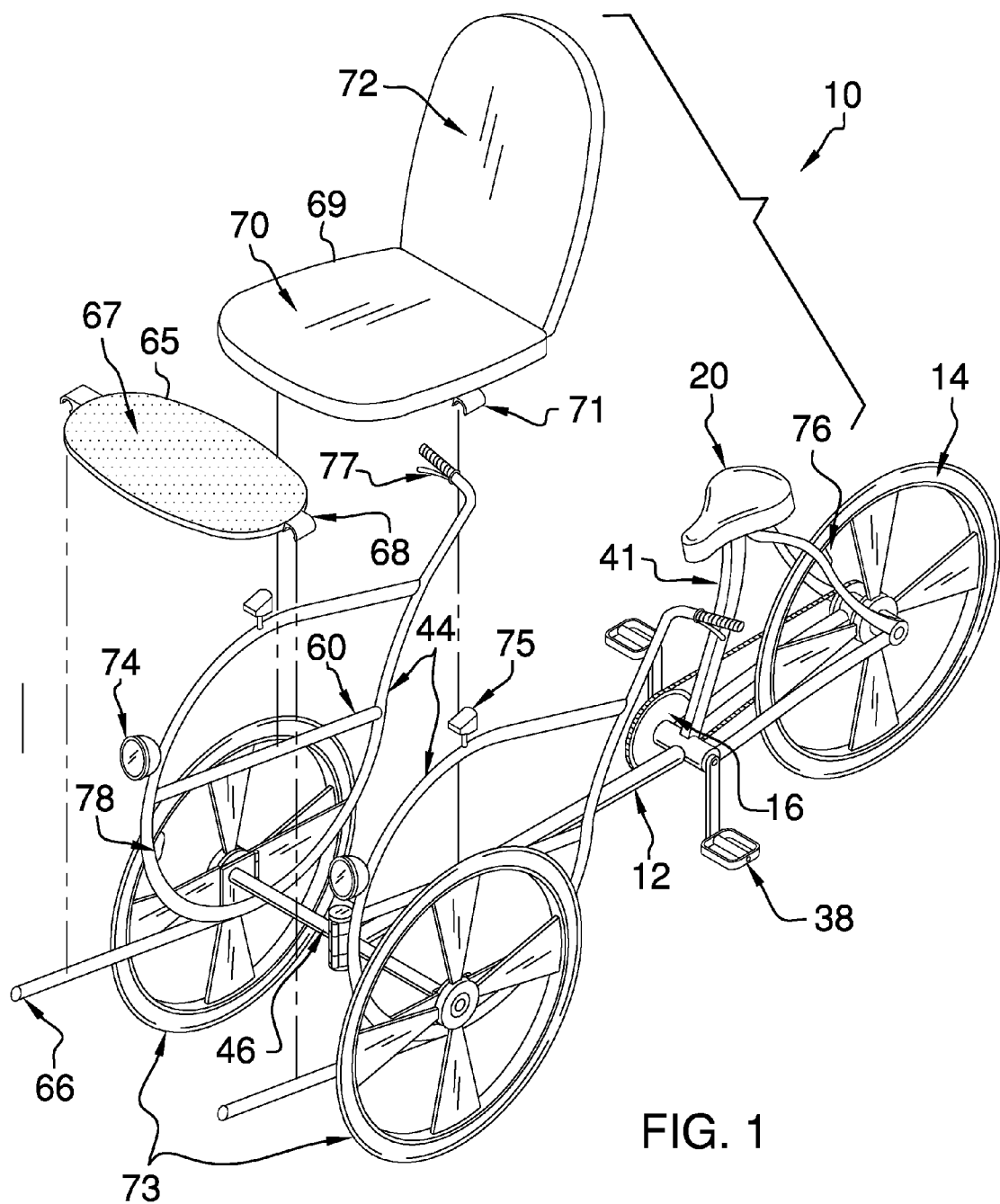
FIG. 1 is an isometric perspective view of a three wheeled velocipede according to an embodiment of the disclosure.
Figure 2:
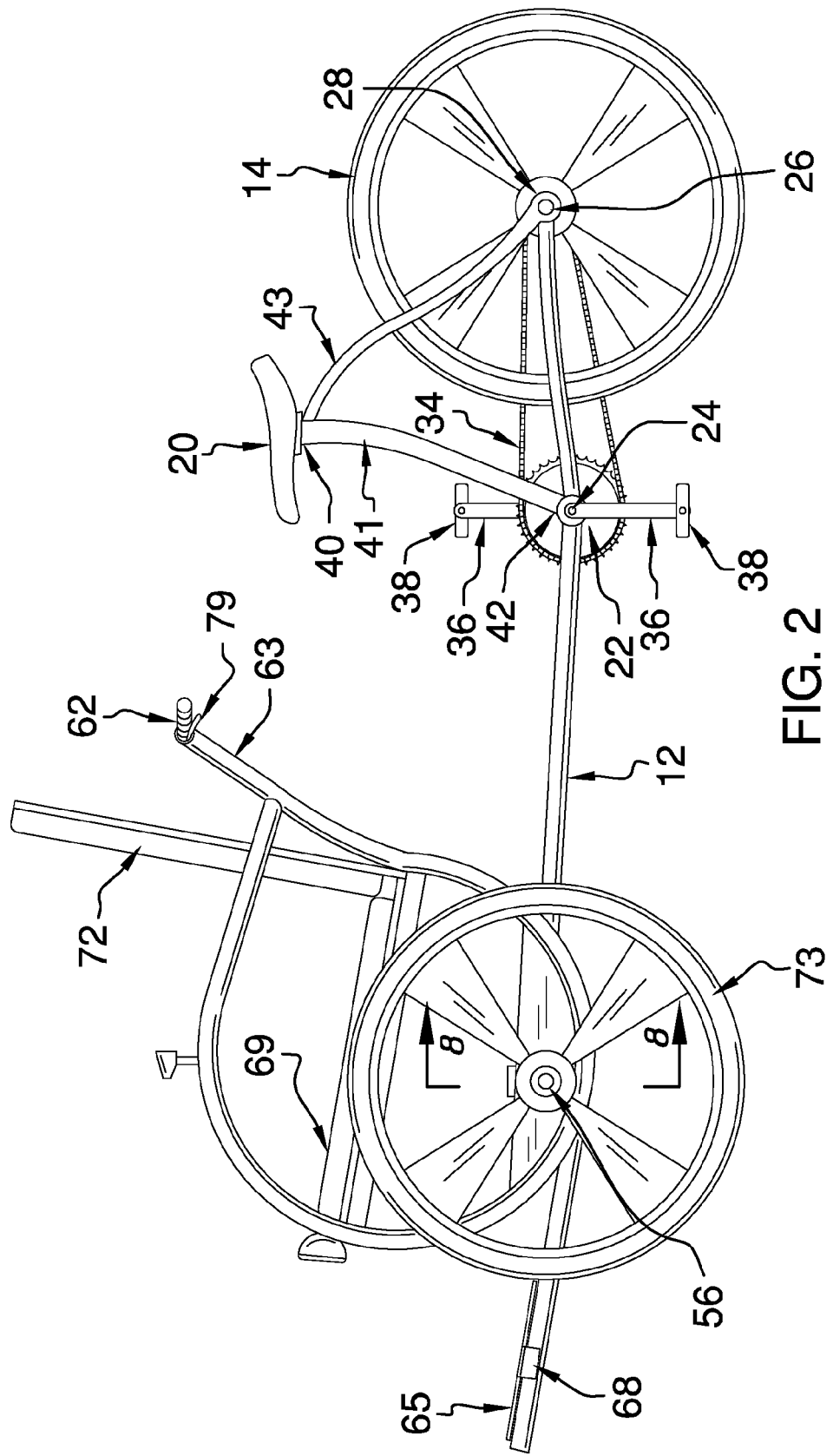
FIG. 2 is a side view of an embodiment of the disclosure.
Figure 3:
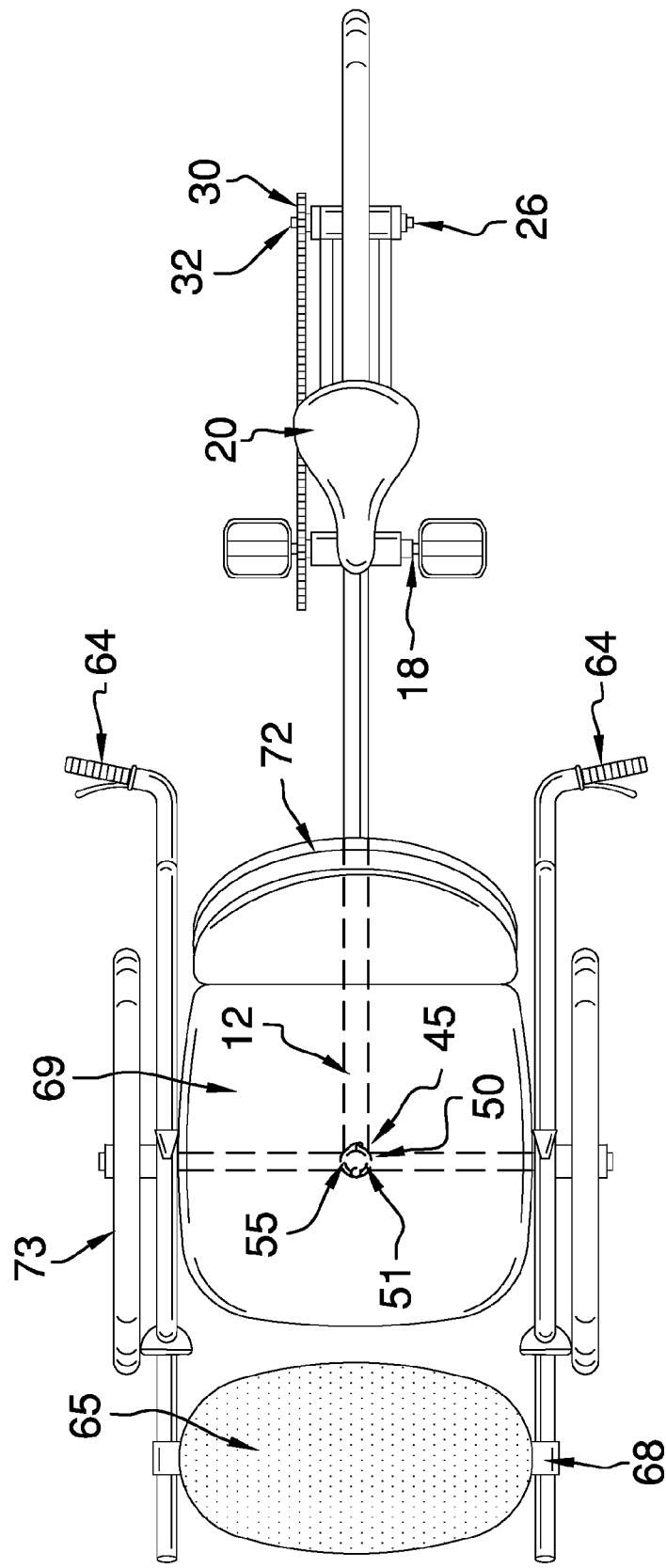
FIG. 3 is a top view of an embodiment of the disclosure.
Figure 4:
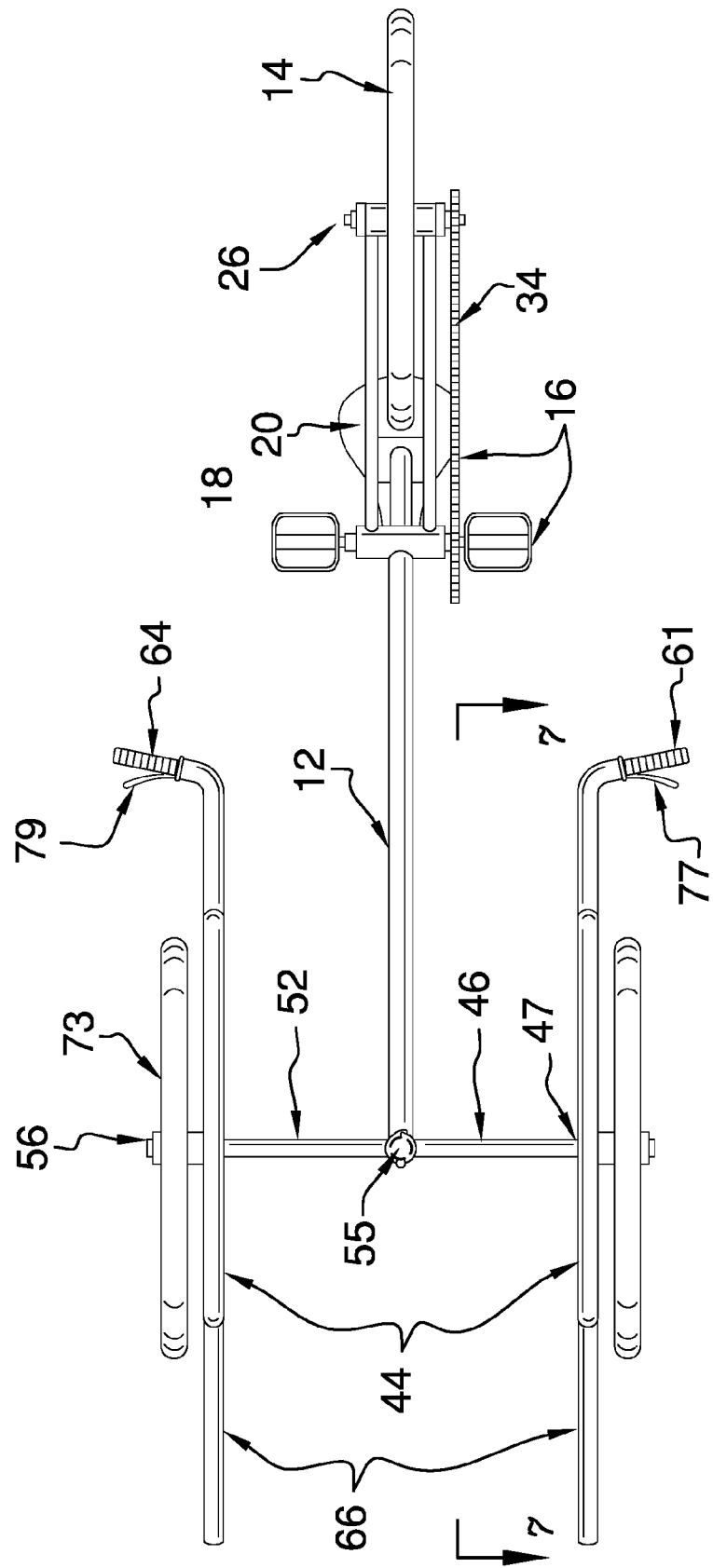
FIG. 4 is a bottom view of an embodiment of the disclosure.
Figure 7:
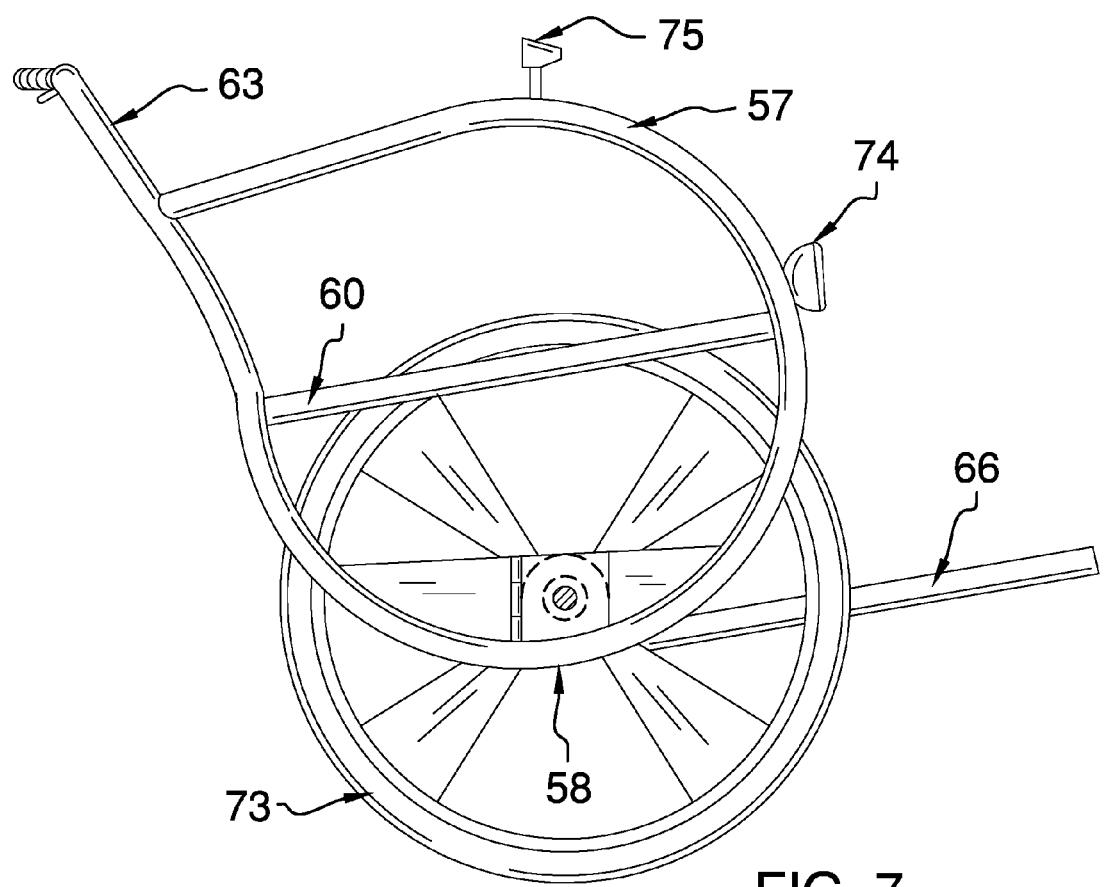
FIG. 7 is a detail view of an embodiment of the disclosure.
Figure 8:
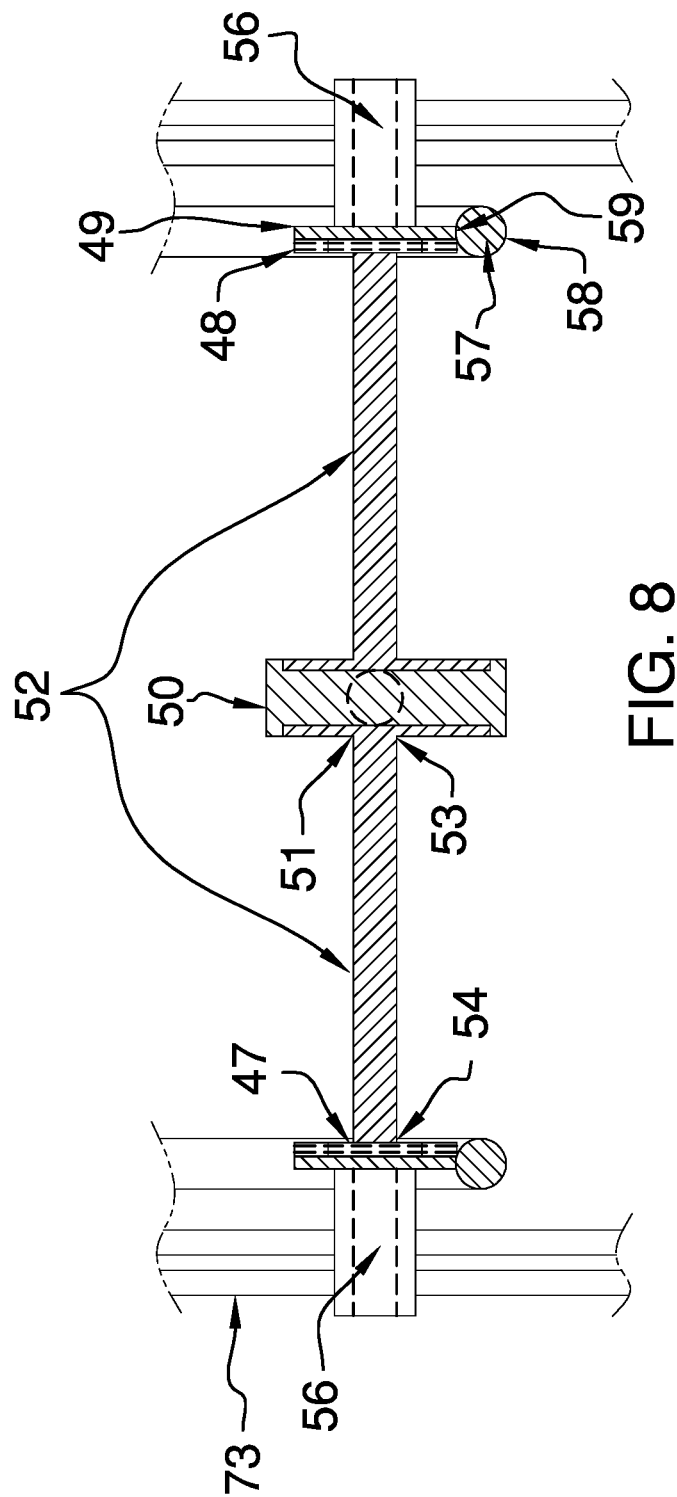
FIG. 8 is a cross-sectional view of an embodiment of the disclosure.

With reference now to the drawings, and in particular to FIGS. 1 through 8 thereof, a new velocipede embodying the principles and concepts of an embodiment of the disclosure and generally designated by the reference numeral 10 will be described.

As best illustrated in FIGS. 1 through 8, the three wheeled velocipede 10 generally comprises a rear frame 12. A rear wheel 14 is rotationally coupled to the rear frame 12. A drive train 16 is coupled to the rear frame 12. The drive train 16 is operationally coupled to the rear wheel 14. The drive train 16 is configured to transfer pedal motion imparted by a driver to the rear wheel 14.

More specifically, the drive train 16 comprises a spindle 18 that is rotationally coupled to the rear frame 12 below a first seat 20. A plurality of front sprockets 22 is coupled proximate to a respective opposing end 24 of the spindle 18. Preferably, the plurality of front sprockets 22 comprises one front sprocket 22. An axle 26 is rotationally coupled to a back end 28 of the rear frame 12. The rear wheel 14 is coupled to the axle 26. A plurality of rear sprockets 30 is coupled to a respective opposing terminus 32 of the axle 26. Preferably, the plurality of rear sprockets 30 comprises one rear sprocket 30. A chain 34, which is looped and complementary to the front sprockets 22 and the rear sprockets 30, is operationally connected to a respective front sprocket 22 and a respective rear sprocket 30. Each of a pair of crank arms 36 is coupled to a respective opposing end 24 of the spindle 18. Each of a pair of pedals 38 is rotationally coupled to a respective crank arm 36 distal from the spindle 18. The pedals 38 are positioned on the crank arms 36 such that the feet of the driver are positionable on the pedals 38. Pedal motion imparted by the driver is transferred through the chain 34 to the axle 26 to rotate the rear wheel 14.

The first seat 20 is coupled to the rear frame 12 and is configured to seat the driver. Preferably, the first seat 20 is coupled to a top end 40 of a seat post 41. The seat post 41 has a bottom end 42 that is coupled to the rear frame 12 proximate to the spindle 18. Each of a pair of seat support rods 43 is coupled to and extends between the top end 40 of the seat post 41 and the back end 28 of the rear frame 12.

A front frame 44 is pivotally coupled to a front end 45 of the rear frame 12. The front frame 44 comprises a support 46, which has a pair of ends 47. The support 46 is pivotally coupled to the front end 45 of the rear frame 12. Each of a pair of first plates 48 is coupled to a respective end 47 of the support 46. Each of a pair of second plates 49 is hingedly coupled to a respective first plate 48. The second plate 49 and the respective first plate 48 are lockable in a closed configuration.

The support 46 comprises a pivot housing 50 that is coupled to the front end 45 of the rear frame 12. The pivot housing 46 is tubular and vertically positioned. A pivot bar 51, which is complementary to the pivot housing 46, is positioned in the pivot housing 46. The support 46 also comprises a pair of rods 52 each having a first end 53 and a second end 54. The first ends 53 are hingedly coupled to the pivot bar 51. Each second end 54 is coupled to a respective first plate 48. The first ends 53 of the pair of rods 52 comprise a locking clasp 55, such that the pair of rods 52 is lockable when each rod 52 is perpendicular to the rear frame 12. Each of a pair of front hubs 56 is rotationally coupled to a respective second plate 49. Each of a pair of front wheels 73 is coupled to a respective front hub 56. The rods 52 are foldable forward relative to the rear frame 12 and each front wheel 73 is foldable to substantial parallelism with the pair of rods 52.

The front frame 44 also comprises a pair of loops 57. Each loop 57 is rigid, substantially circular, and has a lower end 58. The lower end 58 is coupled to a lower edge 59 of a respective second plate 49. Each of a pair of crossbars 60 is coupled across a respective loop 57. The crossbar 60 is substantially horizontally positioned within the respective loop 57. The front frame 44 also may include a plurality of cross members. Each cross member is coupled to and extends between the pair of loops 57 to provide additional rigidity to the front frame 44. Preferably, the cross members are foldable.

Each of a pair of handles 61 is coupled to a respective loop 57 and extends toward the rear frame 12. Preferably, each handle 61 has an upper section 62 that extends transversely from a lower section 63, such that the upper section 62 is configured for grasping in a hand of the driver. Also preferably, each handle 61 is coupled to a respective grip 64.

The front frame 44 also comprises a footrest 65. The footrest 65 comprises a pair of extender rods 66. Each extender rod 66 is coupled to a respective loop 57 proximate to the first plate 48. The extender rod 66 extends transversely from the rear frame 12 and is substantially perpendicular to the support 46. The footrest 65 also comprises a first panel 67 that is rigid. A plurality of couplers 68 is coupled to the first panel 67. The couplers 68 are complementary to the extender rods 66. Preferably, the plurality of couplers 68 comprises two couplers 68. The couplers 68 are positioned on the first panel 67 such that the first panel 67 is couplable to the pair of extender rods 66.

A second seat 69 is couplable to the front frame 44, such that the second seat 69 is positionable to seat a passenger. The second seat 69 comprises a second panel 70 that is rigid. Preferably, the second panel 70 is padded. A plurality of fasteners 71 is coupled to the second panel 70. The fasteners 71 are complementary to the crossbars 60. Preferably, the plurality of fasteners 71 comprises two fasteners 71. The fasteners 71 are positioned on the second panel 70 such that the second panel 70 is couplable to the pair of crossbars 60.

A seat back 72 is coupled to and extends transversely from the second panel 70. The seat back 72 is positioned on the second panel 70 to provide support to a back of the passenger.

Each of a pair of headlights 74 is coupled to a respective loop 57. Each headlight 74 is positioned proximate to a respective crossbar 60 distal from a respective handle 61. Each of a pair of mirrors 75 is coupled to a respective loop 57. Each mirror 75 is positioned substantially equally distant from a respective handle 61 and a respective headlight 74.

A first brake 76 is coupled to the rear frame 12. The first brake 76 is configured to hinder rotation of the rear wheel 14. A first lever 77 is pivotally coupled to a respective handle 61. The first lever 77 is operationally coupled to the first brake 76. The first lever 77 is positioned on the respective handle 61 such that pivoting the first lever 77 engages the first brake 76. A second brake 78 is coupled to the front frame 44. The second brake 78 is configured to hinder rotation of at least one of the front wheels 73. A second lever 79 is pivotally coupled to a respective handle 61. The second lever 79 is operationally coupled to the second brake 78. The second lever 79 is positioned on the respective handle 61 such that pivoting the second lever 79 engages the second brake 78.

In use, the first seat 20 is positioned on the rear frame 12 such that the driver is positioned to engage the pedals 38. Pedal motion imparted by the driver is transferred through the drive train 16 to the rear wheel 14 to induce forward motion. The front frame 44 is configured to accommodate the passenger in the second seat 59, which is coupled to the crossbars 60. The footrest 65 is configured for support of the passenger's legs and the seat back 72 is configured to support the passenger's back. The first lever 77 and second lever 79 are positioned on respective handles 61 such that pivoting the first lever 77 and the second lever 79 will engage respectively the first brake 76 and the second brake 78 to stop forward motion. The first plates 48 each being hingedly coupled to a respective second plate 49 and the rods 526 each being hingedly coupled to the pivot bar 51 allow a user to fold the front frame 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A three wheeled velocipede comprising:
a rear frame;
a rear wheel, said rear wheel being rotationally coupled to said rear frame;
a drive train, said drive train being coupled to said rear frame, said drive train being operationally coupled to said rear wheel, wherein said drive train is configured to transfer pedal motion imparted by a driver to said rear wheel;
a first seat, said first seat being coupled to said rear frame, said first seat being configured to seat the driver;
a front frame, said front frame being pivotally coupled to a front end of said rear frame, said front frame comprising
a support, said support being pivotally coupled to a front end of said rear frame, said support having a pair of ends,
a pair of first plates, each said first plate being coupled to a respective end of said support,
a pair of second plates, each said second plate being hingedly coupled to a respective said first plate, said second plate and said respective said first plate being lockable in a closed configuration,
a pair of loops, each said loop being rigid and substantially circular, each said loop having a lower end, said lower end being coupled to a lower edge of a respective said second plate,
a pair of crossbars, each said crossbar being coupled across a respective said loop, wherein said crossbar is substantially horizontally positioned within said respective said loop,
a pair of front hubs, each said front hub being rotationally coupled to a respective said second plate, each said front wheel being coupled to a respective said front hub, and
a pair of handles, each said handle being coupled to a respective said loop and extending toward said rear frame;

a second seat, said second seat being couplable to said front frame, wherein said second seat is positionable to seat a passenger; and a pair of front wheels, each said front wheel being rotationally coupled to a respective opposing side of said front frame.

2. The velocipede of claim 1, further including said drive train comprising:

a spindle, said spindle being rotationally coupled to said rear frame below said seat;

a plurality of front sprockets, said plurality of front sprockets being coupled proximate to a respective opposing end of said spindle;

an axle, said axle being rotationally coupled to a back end of said rear frame, said rear wheel being coupled to said axle;

a plurality of rear sprockets, said plurality of rear sprockets being coupled to a respective opposing terminus of said axle;

a chain, said chain being looped, said chain being complementary to said front sprockets and said rear sprockets, said chain being operationally connected to a respective said front sprocket and a respective said rear sprocket;

a pair of crank arms, each said crank arm being coupled to a respective said opposing end of said spindle;

a pair of pedals, each said pedal being rotationally coupled to a respective said crank arm distal from said spindle; and wherein said pedals are positioned on said crank arms such that the feet of the driver are positionable on said pedals, wherein pedal motion imparted by the driver is transferred through said chain to said axle to rotate said rear wheel.

3. The velocipede of claim 2, further including said first seat being coupled to a top end of seat post, said seat post having a bottom end, said bottom end being coupled to said rear frame proximate to said spindle.

4. The velocipede of claim 3, further including a pair of seat support rods, each said seat support rod being coupled to and extending between said top end of said seat post and said back end of said rear frame.

5. The velocipede of claim 2, further including said plurality of front sprockets comprising one front sprocket.

6. The velocipede of claim 2, further including said plurality of rear sprockets comprising one rear sprocket.

7. The velocipede of claim 1, further including each said handle having an upper section extending transversely from a lower section, such that said upper section is configured for grasping in a hand of the driver.

8. The velocipede of claim 1, further including each said handle being coupled to a respective grip.

9. The velocipede of claim 1, further including said support comprising:

a pivot housing, said pivot housing being coupled to said front end of said rear frame, said pivot housing being tubular, said pivot housing being vertically positioned;

a pivot bar, said pivot bar being complementary to and positioned in said pivot housing;

a pair of rods, each said rod having a first end and a second end, said first end being hingedly coupled to said pivot bar, said second end being coupled to a respective said first plate, said first ends of said pair of rods comprising a locking clasp, wherein said pair of rods is lockable when each said rod is perpendicular to said rear frame; and wherein each said rod is foldable forward relative to said rear frame and each said front wheel is foldable to substantial parallelism with said pair of rods.

10. The velocipede of claim 1, further including said front frame including a footrest, said footrest comprising:

a pair of extender rods, each said extender rod being coupled to a respective said loop proximate to said first plate, said extender rod extending transversely from said rear frame, said extender rod being substantially perpendicular to said support;

a first panel, said panel first being rigid;

a plurality of couplers, said couplers being coupled to said first panel, said couplers being complementary to said extender rods; and wherein each said coupler is positioned on said first panel such that said first panel is couplable to said pair of extender rods.

11. The velocipede of claim 10, further including said plurality of couplers comprising two couplers.

12. The velocipede of claim 1, further including said second seat comprising:

a second panel, said second panel being rigid, said second panel being padded;

a plurality of fasteners, said fasteners being coupled to said second panel, said fasteners being complementary to said crossbars; and wherein each said fastener is positioned on said second panel such that said second panel is couplable to said pair of crossbars.

13. The velocipede of claim 12, further including said plurality of fasteners comprising two fasteners.

14. The velocipede of claim 13, further including a seat back, said seat back being coupled to and extending transversely from said second panel, wherein said seat back is positioned on said second panel to provide support to a back of the passenger.

15. The velocipede of claim 1, further including a pair of headlights, each said headlight being coupled to a respective said loop, said headlight being positioned proximate to a respective said crossbar distal from a respective said handle.

16. The velocipede of claim 15, further including a pair of mirrors, each said mirror being coupled to a respective said loop, said mirror being positioned substantially equally distant from a respective said handle and a respective said headlight.

17. The velocipede of claim 1, further comprising:

a first brake, said first brake being coupled to said rear frame, said first brake being configured to hinder rotation of said rear wheel;

a first lever, said first lever being pivotally coupled to a respective said handle, said first lever being operationally coupled to said first brake; and wherein said first lever is positioned on said respective said handle such that pivoting said first lever engages said first brake.

18. The velocipede of claim 1, further comprising:

a second brake, said second brake being coupled to said front frame, said second brake being configured to hinder rotation of at least one of said front wheels;

a second lever, said second lever being pivotally coupled to a respective said handle, said second lever being operationally coupled to said second brake; and wherein said second lever is positioned on said respective said handle such that pivoting said second lever engages said second brake.

19. A three wheeled velocipede comprising:
a rear frame;
a rear wheel, said rear wheel being rotationally coupled to said rear frame;
a drive train, said drive train being coupled to said rear frame, said drive train being operationally coupled to said rear wheel, wherein said drive train is configured to transfer pedal motion imparted by a driver to said rear wheel, said drive train comprising:
  a spindle, said spindle being rotationally coupled to said rear frame below said seat,
  a plurality of front sprockets, said plurality of front sprockets being coupled proximate to a respective opposing end of said spindle, said plurality of front sprockets comprising one front sprocket,
  an axle, said axle being rotationally coupled to a back end of said rear frame, said rear wheel being coupled to said axle,
  a plurality of rear sprockets, said plurality of rear sprockets being coupled to a respective opposing terminus of said axle, said plurality of rear sprockets comprising one rear sprocket,
  a chain, said chain being looped, said chain being complementary to said front sprockets and said rear sprockets, said chain being operationally connected to a respective said front sprocket and a respective said rear sprocket,
  a pair of crank arms, each said crank arm being coupled to a respective said opposing end of said spindle,
  a pair of pedals, each said pedal being rotationally coupled to a respective said crank arm distal from said spindle, and
  wherein said pedals are positioned on said crank arms such that the feet of the driver are positionable on said pedals, wherein pedal motion imparted by the driver is transferred through said chain to said axle to rotate said rear wheel;
a first seat, said first seat being coupled to said rear frame, said first seat being configured to seat the driver, said first seat being coupled to a top end of seat post, said seat post having a bottom end, said bottom end being coupled to said rear frame proximate to said spindle, a pair of seat support rods, each said seat support rod being coupled to and extending between said top end of said seat post and said back end of said rear frame;
a front frame, said front frame being pivotally coupled to a front end of said rear frame; said front frame comprising:
  a support, said support being pivotally coupled to a front end of said rear frame, said support having a pair of ends,
  a pair of first plates, each said first plate being coupled to a respective end of said support,
  a pair of second plates, each said second plate being hingedly coupled to a respective said first plate, said second plate and said respective said first plate being lockable in a closed configuration,
  a pair of loops, each said loop being rigid and substantially circular, each said loop having a lower end, said lower end being coupled to a lower edge of a respective said second plate,
  a pair of crossbars, each said crossbar being coupled across a respective said loop, wherein said crossbar is substantially horizontally positioned within said respective said loop,
  a pair of front hubs, each said front hub being rotationally coupled to a respective said second plate, each said front wheel being coupled to a respective said front hub, and
  a pair of handles, each said handle being coupled to a respective said loop and extending toward said rear frame, each said handle having an upper section extending transversely from a lower section, such that said upper section is configured for grasping in a hand of the driver, each said handle being coupled to a respective grip;
said support comprising:
  a pivot housing, said pivot housing being coupled to said front end of said rear frame, said pivot housing being tubular, said pivot housing being vertically positioned,
  a pivot bar, said pivot bar being complementary to and positioned in said pivot housing,
  a pair of rods, each said rod having a first end and a second end, said first end being hingedly coupled to said pivot bar, said second end being coupled to a respective said first plate, said first ends of said pair of rods comprising a locking clasp, wherein said pair of rods is lockable when each said rod is perpendicular to said rear frame, and
  wherein each said rod is foldable forward relative to said rear frame and each said front wheel is foldable to substantial parallelism with said pair of rods;
said front frame including a footrest, said footrest comprising:
  a pair of extender rods, each said extender rod being coupled to a respective said loop proximate to said first plate, said extender rod extending transversely from said rear frame, said extender rod being substantially perpendicular to said support,
  a first panel, said panel first being rigid,
  a plurality of couplers, said couplers being coupled to said first panel, said couplers being complementary to said extender rods, said plurality of couplers comprising two couplers, and
  wherein each said coupler is positioned on said first panel such that said first panel is couplable to said pair of extender rods;
a second seat, said second seat being couplable to said front frame, wherein said second seat is positionable to seat a passenger, said second seat comprising:
  a second panel, said second panel being rigid, said second panel being padded,
  a plurality of fasteners, said fasteners being coupled to said second panel, said fasteners being complementary to said crossbars, said plurality of fasteners comprising two fasteners, and
  wherein each said fastener is positioned on said second panel such that said second panel is couplable to said pair of crossbars;
a seat back, said seat back being coupled to and extending transversely from said second panel, wherein said seat back is positioned on said second panel to provide support to a back of the passenger;
a pair of front wheels, each said front wheel being rotationally coupled to a respective opposing side of said front frame;
a pair of headlights, each said headlight being coupled to a respective said loop, said headlight being positioned proximate to a respective said crossbar distal from a respective said handle;

a pair of mirrors, each said mirror being coupled to a respective said loop, said mirror being positioned substantially equally distant from a respective said handle and a respective said headlight;

a first brake, said first brake being coupled to said rear frame, said first brake being configured to hinder rotation of said rear wheel;

a first lever, said first lever being pivotally coupled to a respective said handle, said first lever being operationally coupled to said first brake, wherein said first lever is positioned on said respective said handle such that pivoting said first lever engages said first brake;

a second brake, said second brake being coupled to said front frame, said second brake being configured to hinder rotation of at least one of said front wheels; and a second lever, said second lever being pivotally coupled to a respective said handle, said second lever being operationally coupled to said second brake, wherein said second lever is positioned on said respective said handle such that pivoting said second lever engages said second brake.

* * * * *